(12) United States Patent
Han et al.

(10) Patent No.: US 11,698,290 B2
(45) Date of Patent: Jul. 11, 2023

(54) CONTRASTIVE LEARNING OF UTILITY POLE REPRESENTATIONS FROM DISTRIBUTED ACOUSTIC SENSING SIGNALS

(71) Applicant: NEC Laboratories America, Inc., Princeton, NJ (US)

(72) Inventors: Shaobo Han, Princeton, NJ (US); Yue Tian, Princeton, NJ (US); Sarper Ozharar, Princeton, NJ (US); Yangmin Ding, North Brunswick, NJ (US); Ting Wang, West Windsor, NJ (US)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 17/714,091

(22) Filed: Apr. 5, 2022

(65) Prior Publication Data
US 2022/0381607 A1  Dec. 1, 2022

Related U.S. Application Data

(60) Provisional application No. 63/171,199, filed on Apr. 6, 2021.

(51) Int. Cl.
*G01H 9/00*  (2006.01)
(52) U.S. Cl.
CPC .................. *G01H 9/004* (2013.01)

(58) Field of Classification Search
None
See application file for complete search history.

(56) References Cited

U.S. PATENT DOCUMENTS

2018/0357542 A1* 12/2018 Wu ..................... G06N 3/045
2019/0324166 A1* 10/2019 Lolla .................... G01V 1/42
2020/0319017 A1* 10/2020 Tian ..................... G02B 6/483

FOREIGN PATENT DOCUMENTS

WO  WO-2020044655 A1 *  3/2020  ............. G01D 5/353

* cited by examiner

*Primary Examiner* — Lisa M Caputo
*Assistant Examiner* — Nigel H Plumb
(74) *Attorney, Agent, or Firm* — Joseph Kolodka

(57) ABSTRACT

Systems and methods for operating a distributed fiber optic sensing (DFOS)/distributed acoustic sensing (DAS) system include a length of optical sensing fiber suspended aerially by a plurality of utility poles and in optical communication with a DFOS interrogator/analyzer. The method includes operating the DFOS/DAS system while manually exciting more than one of the poles to obtain frequency response(s) of the excited poles; contrastively training a convolutional neural network (CNN) with the frequency responses obtained; classifying the utility poles using the contrastively trained CNN; and generating a profile map of the excited poles indicative of the classified utility poles.

8 Claims, 9 Drawing Sheets

| NAME | TYPE | PARAMETERS | OUTPUT SHAPE |
|---|---|---|---|
| LAYER1,0 | Conv2d(1,32,kernel_size=(3,2),stride=(3,2)) | 192,32 | 96,32,42,27 |
| LAYER1,1 | CreLU() | | 96,64,42,27 |
| LAYER1,2 | MaxPool2d(kernel_size=(2,2),stride=(2,2),padding=0, dilation= | | 96,64,21,13 |
| LAYER1,3 | BatchNorm2d(64,eps=1e-05,momentum=0.1,affine=True,track | 64,64 | 96,64,21,13 |
| drop_out | Dropout(p=0.1, inplace=False) | | 96,64,21,13 |
| LAYER2,0 | Conv2d(64,66,kernel_size=(3,2),stride=(1,1)) | 25344,66 | 96,66,19,12 |
| LAYER2,1 | ReLu() | | 96,66,19,12 |
| LAYER2,2 | MaxPool2d(kernel_size=(2,2),stride=(2,2),padding=0,dilation | | 96,66,9,6 |
| LAYER2,3 | BatchNorm2d(64,eps=1e-05,momentum=0.1,affine=True,track | 66,66 | 96,66,9,6 |
| LAYER3,0 | Conv2d(66,68,kernel_size=(3,2),stride=(1,1)) | 26928,68 | 96,68,7,5 |
| LAYER3,1 | ReLu() | | 96,68,7,5 |
| LAYER3,2 | MaxPool2d(kernel_size=(2,2),stride=(2,2),padding=0,dilation | | 96,68,3,2 |
| LAYER3,3 | BatchNorm2d(64,eps=1e-05,momentum=0.1,affine=True,track | 68,68 | 96,68,3,2 |

FIG. 9

CONTRASTIVE LEARNING OF UTILITY POLE REPRESENTATIONS FROM DISTRIBUTED ACOUSTIC SENSING SIGNALS

CROSS REFERENCE TO RELATED APPLICATIONS

This application claims the benefit of U.S. Provisional patent application Serial No. 63/171,199 filed 6 Apr. 2021 the entire contents of each is incorporated by reference as if set forth at length herein.

TECHNICAL FIELD

This disclosure relates generally to distributed fiber optic sensing (DFOS) systems methods and structures. More particularly, it describes methods of contrastive learning of utility pole representations from distribute acoustic sensing (DAS) signals produced during operation of a DFOS/DAS system.

BACKGROUND

As those skilled in the art will readily appreciate, distributed fiber optic sensing systems and methods have shown to be of great utility an provide a range of useful services such as sensing various physical parameters including temperature, vibration, strain, etc., thereby enabling a new era of infrastructure monitoring.

Distributed acoustic sensing techniques measure strain changes (stretch or compression) of optical fiber cores, which are typically protected by outside jackets/sheathing and mounted/suspended on utility poles by fixture structures. Integrity assessment or structure health monitoring of such utility poles can be conducted based on the response signal of the manual excitation (hammer or frequency sweep) on the pole. However, DAS signals captured at a location near a utility pole may include information not only from the characteristics of the utility pole on which the optical sensing fiber is mounted/suspended, but also from a dominant excitation signal, a vibration signal propagating along the optical sensing fiber from a distance (such as transformer), or environmental noises (such as wind or traffic)—all intermixed.

Given the utility of DAS techniques, it is of interest to extract intrinsic information about a utility pole and remove any influence of extrinsic factors from a limited amount of data. However, it is difficult to ascertain a ground truth of these factors during data collection, and it is generally prohibitive to perform experiments that account for all possible combination of factors. Moreover, due to the high volume of DAS waveform data and high variability of utility poles, there is no signal filter or known preprocessing procedure that can achieve this goal.

SUMMARY

An advance in the art is made according to aspects of the present disclosure directed to methods including a data collection procedure and a contrastive learning-based approach, for establishing a profile for each utility pole surveyed, in an embedding space. The unique properties of utility poles are preserved in a low-dimensional feature vector. The similarity between pairs of samples collected at the same or different poles is reflected by the Euclidean distance between the pole embeddings. During data collection—variabilities of excitation signals are manually introduced, e.g., impact strength, impact locations, impact time ambiguity, data collecting location ambiguity on a DFOS/DAS optical sensor fiber/cable. Data so collected provides a learned model learned complete information about a utility pole and is more robust with respect to uncontrollable factors during operation. A model training procedure that effectively extracts a utility pole intrinsic properties (e.g., structure integrity, dimensions, structure variety) and remote extrinsic influence (e.g., excitation strength, weather conditions, road traffic), without knowing the ground truth of these factors. The only identifying label required is an ID of any tested poles, which is readily available. The model is trained adaptively—end-to-end—is advantageously easy-to-implement on modern deep learning frameworks such as Py Porch.

According to aspects of the present disclosure—during data collection—variabilities of excitation signals are manually introduced, e.g. impact strength, impact locations, impact time ambiguity, data collecting location ambiguity on a DFOS optical sensor fiber/cable. Data so collected provides a learned model learned complete information about a utility pole and is more robust with respect to uncontrollable factors during operation.

According to further aspects of the present disclosure— we developed a model training procedure that effectively extracts a utility pole intrinsic properties (e.g., structure integrity, dimensions, structure variety) and remote extrinsic influence (e.g., excitation strength, weather conditions, road traffic), without knowing the ground truth of these factors. The only identifying label required is an ID of any tested poles, which is readily available. The model is trained adaptively—end-to-end—is advantageously easy-to-implement on modern deep learning frameworks such as PyTorch.

BRIEF DESCRIPTION OF THE DRAWING

A more complete understanding of the present disclosure may be realized by reference to the accompanying drawing in which:

FIG. 9 illustrating an exemplary model architecture of a neural network used for pole profiling according to aspects of the present disclosure;

Figure 1:
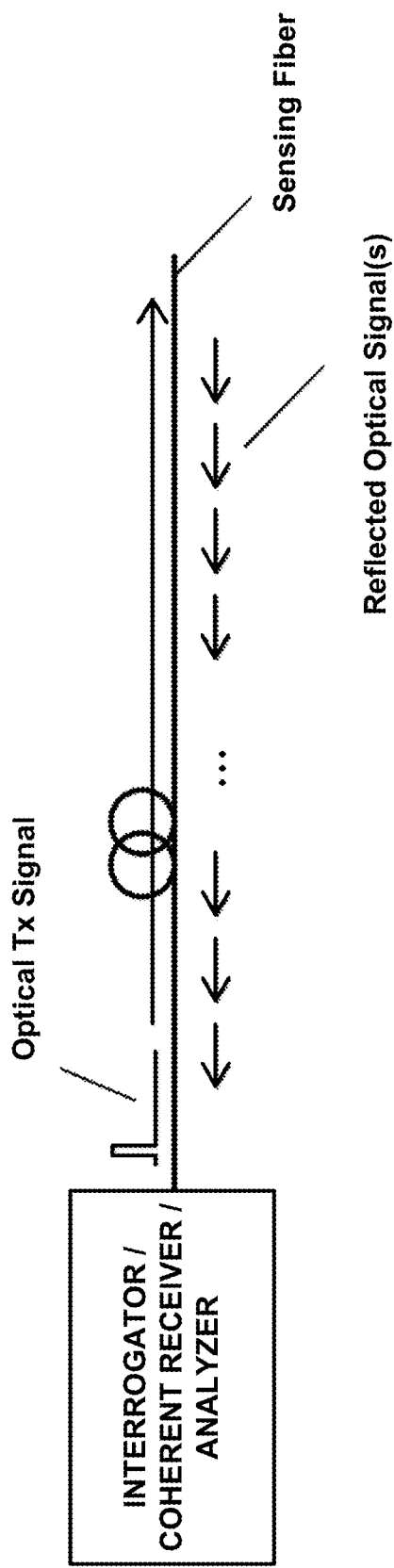
FIG. 1 is a schematic diagram of an illustrative prior art distributed fiber optic sensing system.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a prior art distributed fiber optic sensing system is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Rayleigh back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters). Acoustic disturbance acting on the sensor fiber generates microscopic elongation or compression of the fiber (micro-strain), which causes a change in the phase relation and/or amplitude of the light pulses traversing therein.

Before a next laser pulse is be transmitted, a previous pulse must have had time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically half of the pulse rate. As higher frequencies are attenuated very quickly, most of the relevant ones to detect and classify events are in the lower of the 2 kHz range.

As noted, distributed acoustic sensing (DAS) techniques measure strain changes (stretch or compression) of optical sensor fiber cores, which are typically included as part of a larger cable assembly—protected by an outside jacket and mounted/suspended on utility poles by fixture structures. Integrity assessment or structure health monitoring of the utility poles can be conducted based on a response signal of a manual excitation (hammer or frequency sweep) performed on the pole.

Note however that DAS signals captured at a location proximate to a utility pole may include information not only from the characteristics of the utility pole, but also from a dominating excitation signal, a vibration signal propagating along the sensor fiber cable from a distance relatively far away (such as transformer), or environmental noises (such as wind or traffic), all intermixed together.

It is of interest to extract intrinsic information about the pole and remove the influence of extrinsic factors, from limited amount of data. However, it is difficult to know a ground truth of these factors during data collection, and it is generally prohibitive to conduct experiments covering all possible combination of factors. Moreover, due to the high volume of DAS waveform data and high variability encountered in deployed utility poles, there is no hand-crafted signal filter or known preprocessing procedure that can achieve this goal. The performance of downstream algorithms are heavily dependent on the choice of representation.

With this background in place, we note our inventive method involves both a data collection procedure and a contrastive learning-based approach, for establishing a profile for each utility pole surveyed in an embedding space. The unique properties of individual utility poles are preserved in a low-dimensional feature vector. The similarity between pairs of samples collected at the same or different poles is reflected by the Euclidean distance between the pole embeddings.

In our data collection procedure, variabilities of excitation signals are manually introduced, e.g. impact strength, impact locations, impact time ambiguity, data collecting location ambiguity on the optical sensor cable. This data design makes the model learned include more complete information about the utility pole(s) and results in data that is more robust to uncontrollable factors.

Our model training procedure, effectively extract utility poles' intrinsic properties (e.g., structure integrity, dimensions, structure variety) and remote extrinsic influence (e.g., excitation strength, weather conditions, road traffic), without knowing the ground truth of these factors. The only identification label required is the IDs of any tested utility poles, which is readily available. The model is then trained adaptively and end-to-end. Advantageously, our approach is easy-to-implement on modern deep learning frameworks such as PyTorch.

As we shall show and describe, our inventive approach learns unique features about utility pole characteristics from DAS signals. It facilitates downstream tasks including classification of pole integrity based on human contractor labels, restoration quality evaluation after any decayed poles get repaired/replaced, and change of status detection after extreme weather, earthquakes, or other events.

Our inventive approach establishes a digital utility pole profile based on its frequency response to impulse force recorded by DAS and obtained by machine learning. Our inventive approach advantageously acquires a complete information profile of each utility pole as multiple manual excitations are imposed at different locations on the pole(s), and repeated multiple times.

As we shall describe further, our approach employs a deep metric learning approach, which is trained with supervised learning signals that embeddings of sample pairs collected from the same utility pole shall be closer than sample pairs collected from different poles. This choice increases the size of training data from $O(NK)$ to $O(N^2K^3)$, where K is the number of samples per pole, N is the number of poles. A variant of triplet loss is used to automatically mine hard pairs in the learning phase and avoid the learning plateau. Advantageously, our approach preserves the neighborhood structure while mapping from the original high-dimensional data space to low-dimensional embedding space.

Operationally, the learned pole embedding is used for downstream integrity classification tasks. In particular, a learned neighborhood structure is used to perform selective classification, that is, the model only performs classification on samples for which a sufficiently high confidence exists, while lower confidence samples are rejected. This is crucially important in applications where a high standard of safety and reliability needs to be met.

Figure 2:
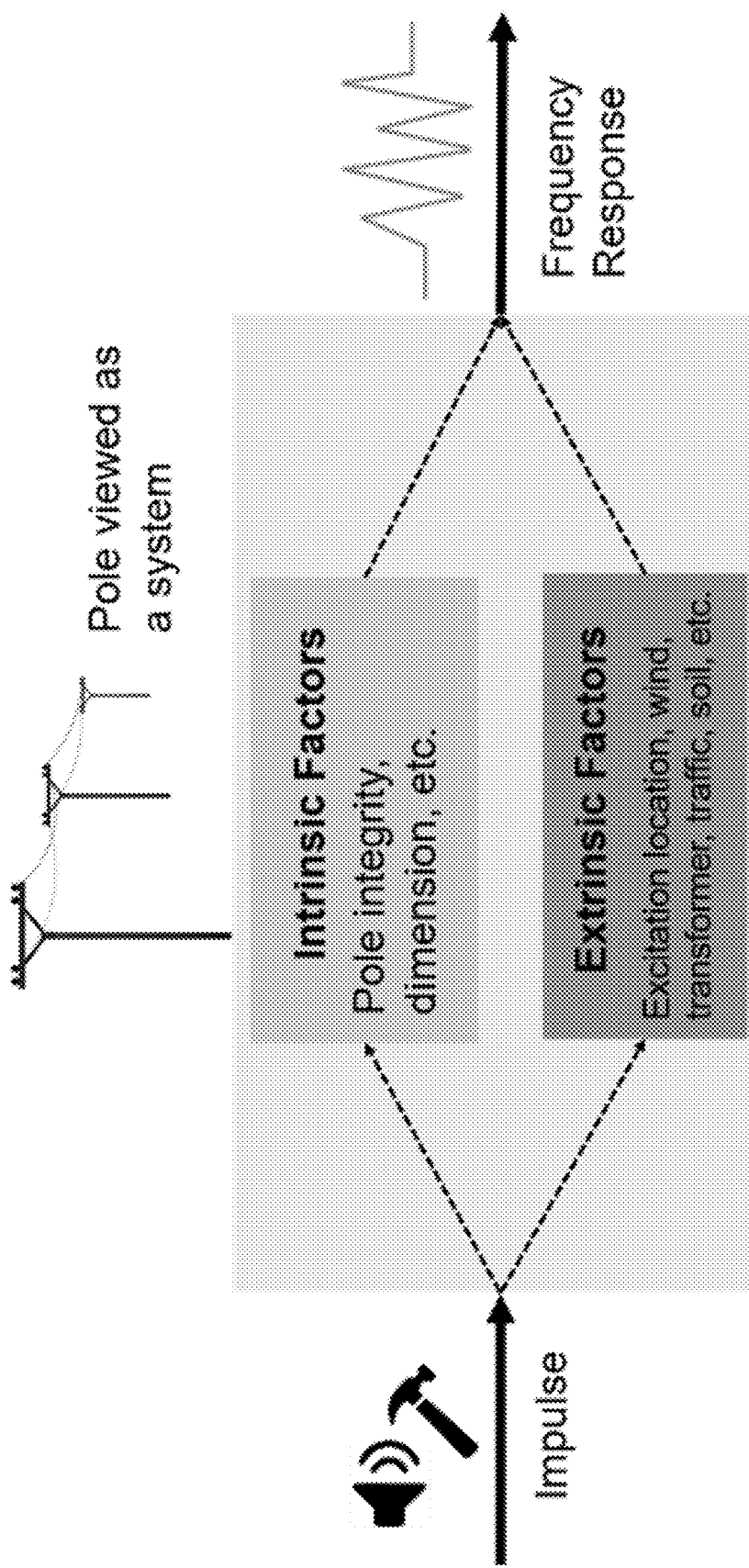
FIG. 2 is a schematic diagram illustrating collected DAS signals influenced by several intrinsic and extrinsic factors according to aspects of the present disclosure.

A positional shift between embeddings of the same pole, before and after a major event (such as extreme weather, earthquake, or restoration), suggests potential change of status of the pole or its coupling with cable. The direction of the change (worse or better) can be interpreted by looking at the nearest neighbors. This feature provides useful information for screening of preventive maintenance (e.g., suggest which routes are prioritized for more comprehensive inspection) and objective assessment of the restoration quality FIG. 2 is a schematic diagram illustrating collected DAS signals influenced by several intrinsic and extrinsic factors according to aspects of the present disclosure.

With reference to that figure, we note that an individual utility pole is viewed for our purposes as a system of poles, onto which an impulse such as an acoustic event or a direct mechanical impact will produce a vibration in the pole(s) so impacted. Such vibratory impulse will result in a frequency response that may be detected by our DAS system.

The collected DAS signal are influenced by several intrinsic and extrinsic factors. Such intrinsic factors may include such items as pole integrity, pole dimensions, pole materials, etc., while extrinsic factors may include such items as pole location, excitation location, environmental factors such as wind, weather, or the presence/absence of a transformer or other equipment including electrical and/or other cables/wires suspended therefrom as well as proximity to traffic or other vibration producing activities as well as geologic factors such as soil composition, etc. From these frequency response(s), a representation is needed to extract the intrinsic properties unique to each pole.

Figure 3:
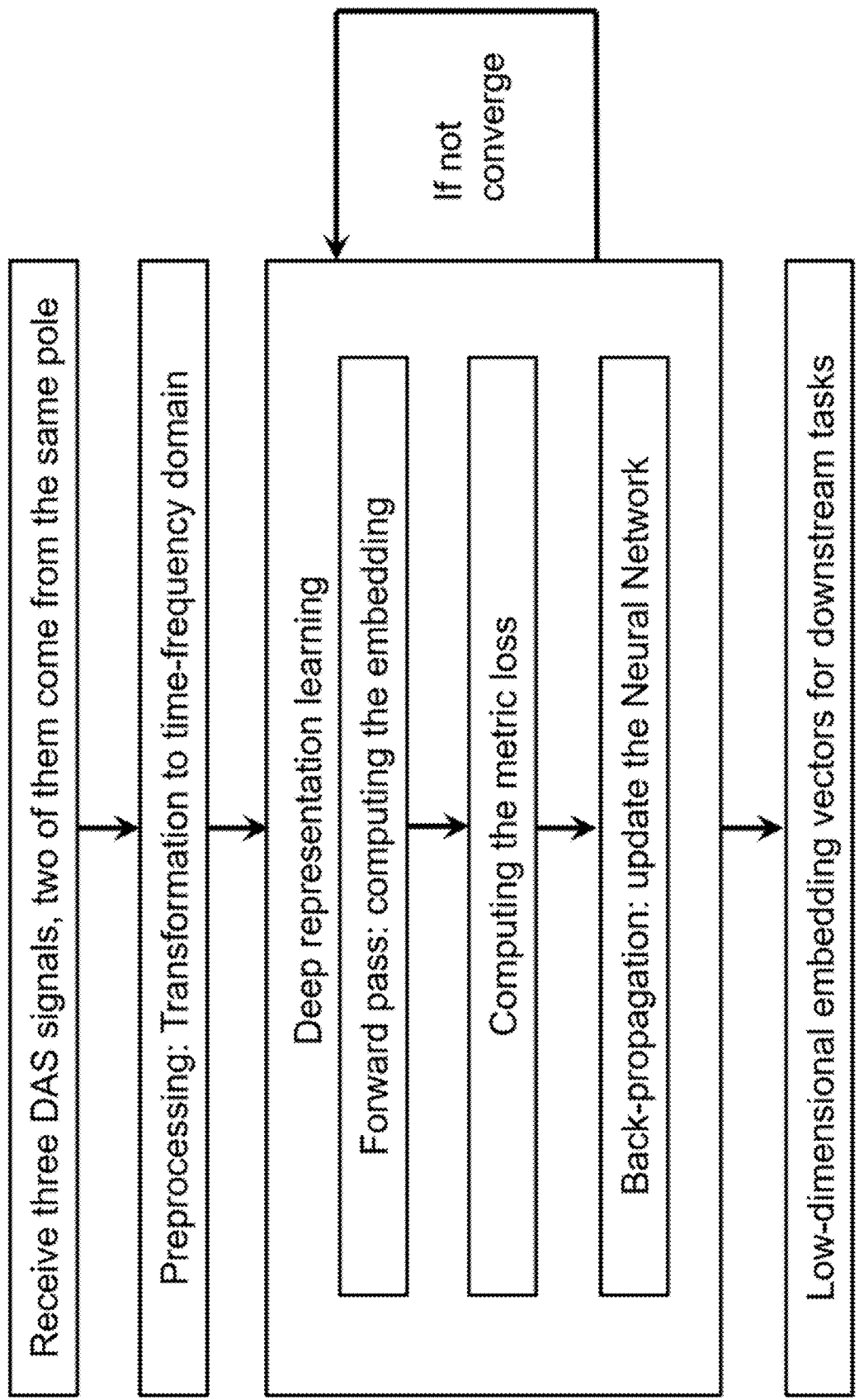
FIG. 3 is a schematic diagram illustrating a flow chart of our deep representation learning approach according to aspects of the present disclosure.

FIG. 3 is a schematic diagram illustrating a flow chart of our deep representation learning approach according to aspects of the present disclosure. With reference to that figure, one may observe an overall operational flow of an inventive method according to aspects of the present disclosure.

Operationally, our inventive procedure as depicted in the flow chart begins by receiving at least three DAS signals wherein two of the three originate from the same utility pole of a plurality of poles. The DAS signal(s) are preprocessed in which a transformation is made from a time domain to a frequency domain. With this converted/transformed DAS data, a deep representation learning process proceeds in which a forward pass is performed which determines/computes any embedding and then the metric loss is determined followed by a back-propagation in which a neural network is updated. This deep representation learning proceeds until a sufficient convergence is realized the result of which is a low-dimensional set of embedding vectors for downstream task(s).

Figure 4:
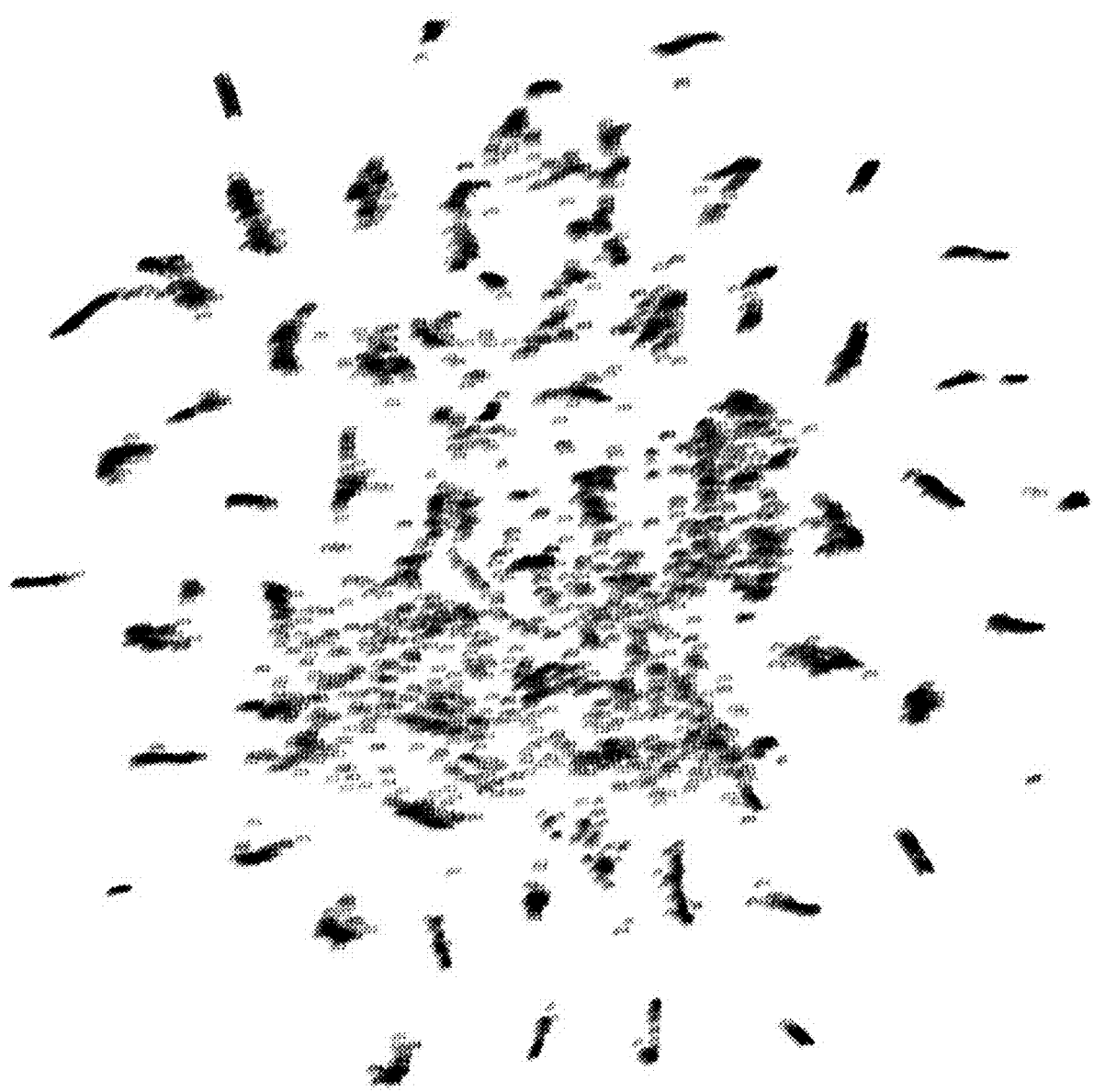
FIG. 4 is a plot illustrating an illustrative pole profile map according to aspects of the present disclosure.

FIG. 4 is a plot illustrating an illustrative pole profile map according to aspects of the present disclosure. This illustrative pole profile map is of 70 utility poles and plotted on the map by our pole profiling. For this map, a training set of 44 poles and a testing set of 26 poles was utilized. Given a random data point, our AI model can tell which pole the data point is from with 93% accuracy.

Example application selective assessment of pole integrity based on confidence. The pole integrity labels can be predicted based on the learned pole embeddings. Our system can be used as a prescreening tool for pole integrity. Due to limited training size, the train classifier is not perfect, whereas the error cost and accuracy benefits are different.

Good poles recognized as "good" are poles which do not require/receive manual inspection, need high confidence and are eventually contribute heavily to costs saved by our model. Bad poles recognized as "bad" are those poles which will be confirmed by manual inspection. Bad poles recognized as "good" are missed alarms, which may be potential hazard, and need to be minimized. Good poles recognized as "bad" are false alarms, which will receive manual inspection, and contribute to costs that are not saved. In this application, a false alarm is less critical than a missed alarm.

Figure 5:
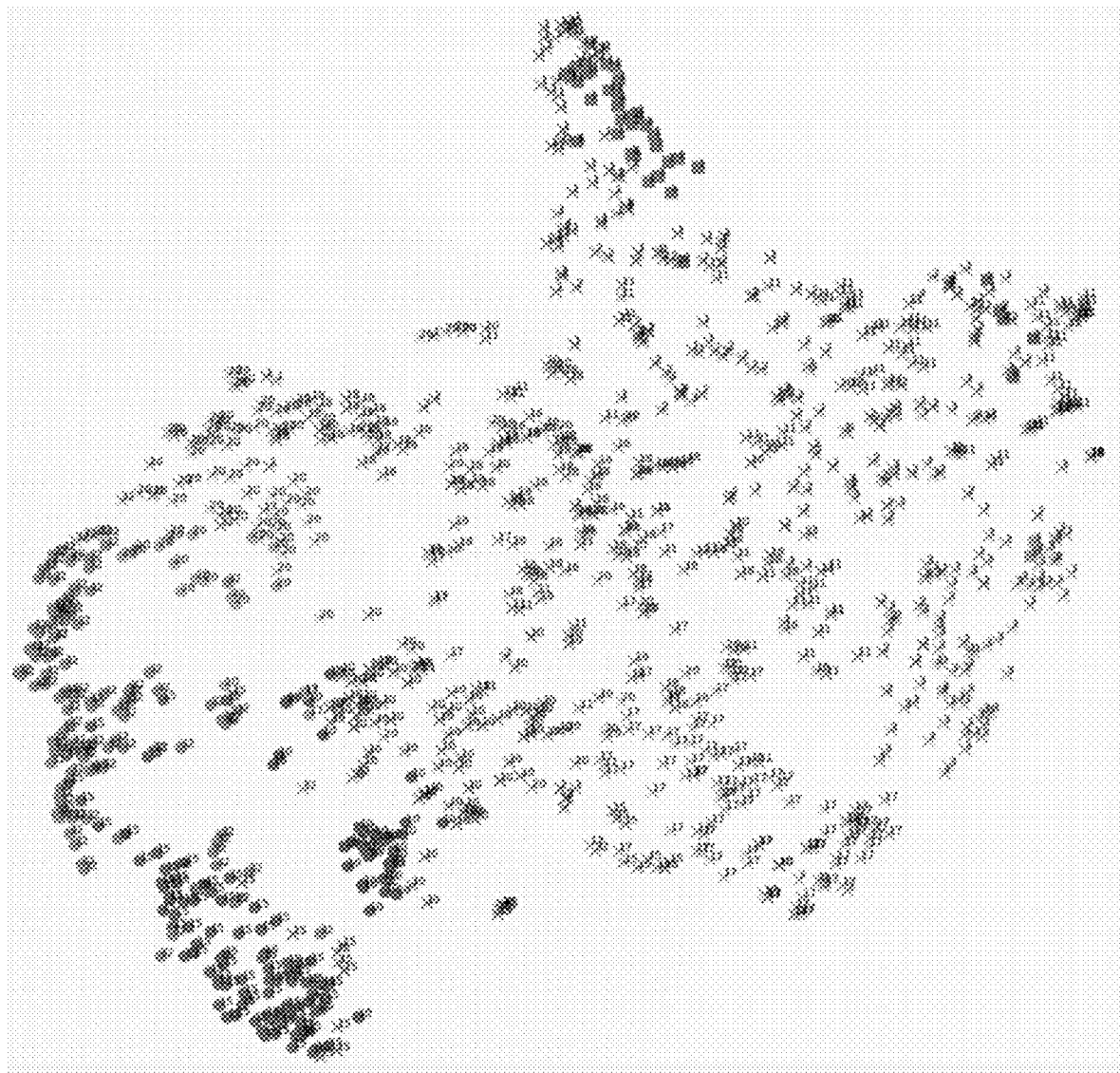
FIG. 5 is a plot illustrating an illustrative pole profile map showing exemplary selective classification on the learned profile map according to aspects of the present disclosure.

Based on the learned neighborhood structure in the profile map, we employ the (k, k') nearest neighbor classification rule with a reject option to filter out the unconfident samples. The model considers k nearest neighbors and rejects a neighbor if less than k' of these are from the same class FIG. 5 is a plot illustrating an illustrative selective classification on a learned profile map according to aspects of the present disclosure showing example pole identity. As depicted in the plot, solid circles are classified as bad poles, while solid squares are classified as good poles. Conversely, crosses depicted in the plot are rejected by the model.

Figure 6:
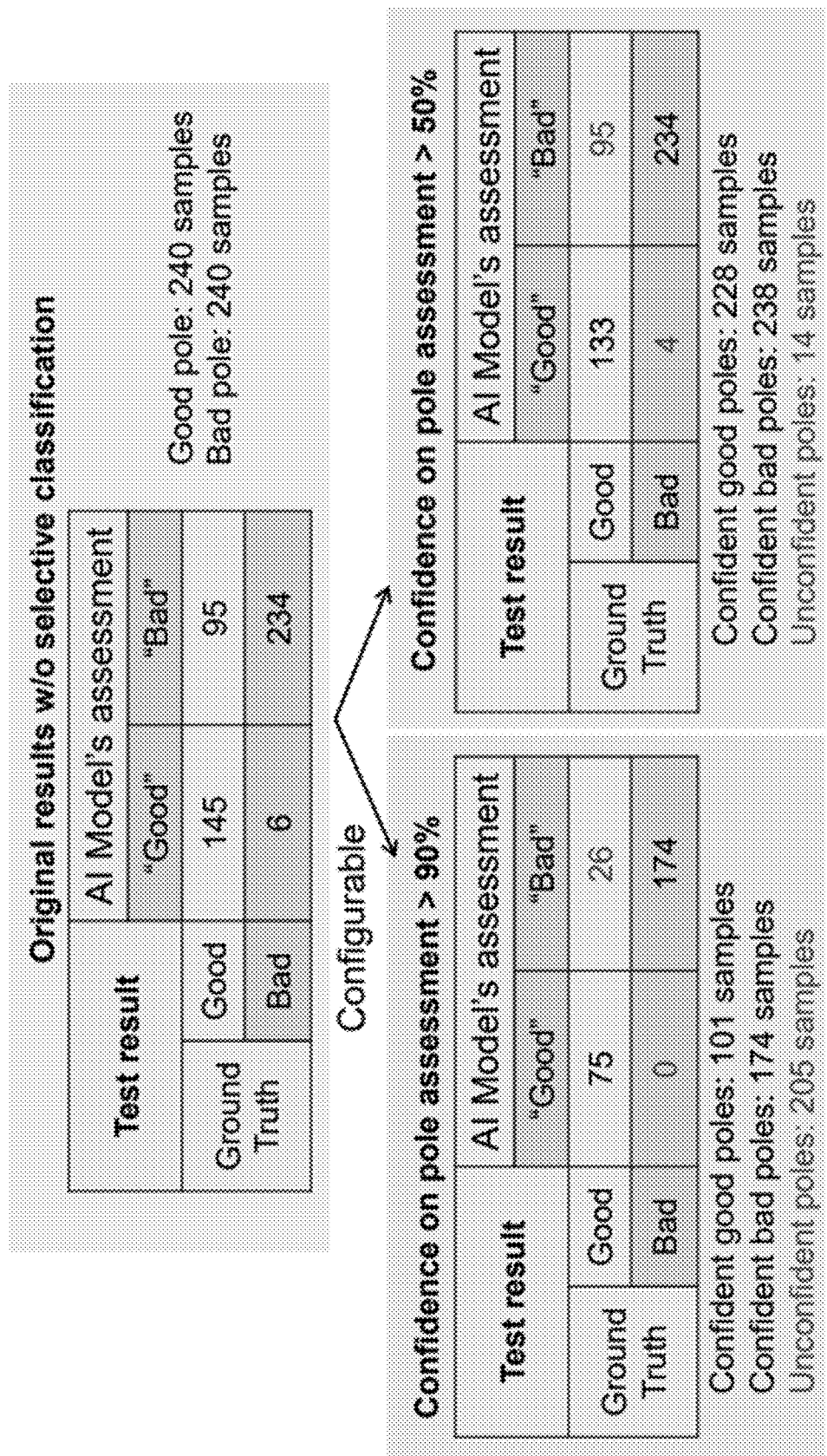
FIG. 6 shows selective classification based on learned embedding including confusion matrix by original KNN classification and classifications with rule (10,0) and classifications with rule (2,1) according to aspects of the present disclosure.

FIG. 6 is a schematic diagram illustrating selective classification based on learned embedding according to aspects of the present disclosure. As shown in the figure, a selective classification based on the learned embedding. Confusion matrix by original KNN classification is shown at the top, while classification with the rule (10, 9) is shown at left, and classification with rule (2, 1) is shown at right.

Example Application—Change of Pole Status After Restoration

Figure 7:
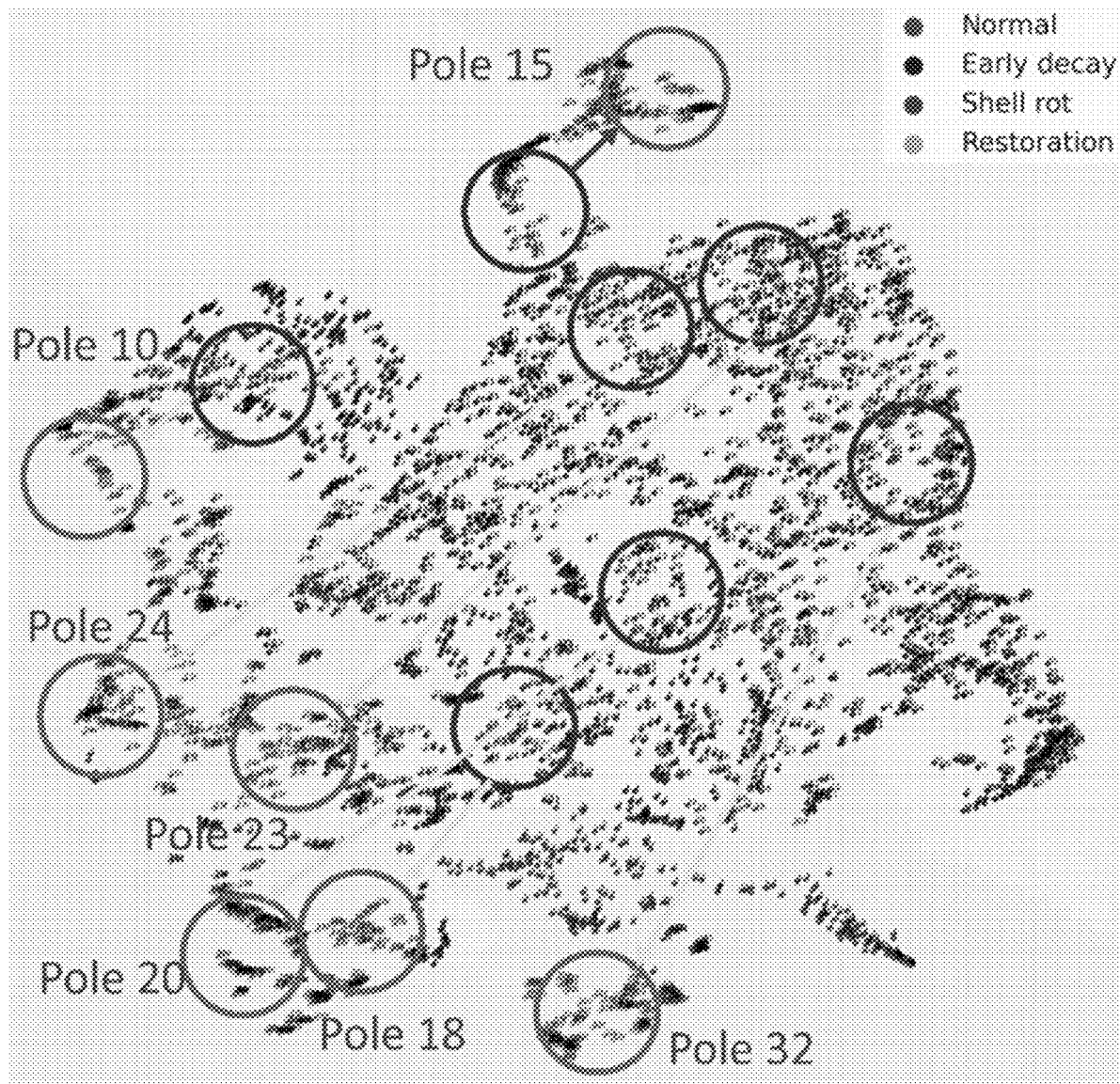
FIG. 7 is a plot illustrating an illustrative pole profile map showing change of status of seven "shell rot external" poles from one route that were initially surrounded by early decay poles. After restoration they are considered as more "normal" according to aspects of the present disclosure.

To evaluate our inventive method, we collected hammer knock data from 7 "bad" poles (Shell Rot External), before and after restoration, and visualize the data together with data collected from other poles (Normal, Early Decay). In the learned latent space, new samples that "shift" from original locations are discovered. More particularly, such samples more closely resemble "normal" poles. Advantageously, a profile map according to aspects of the present disclosure can be used to evaluate whether a restoration on the pole is effective FIG. 7 is a plot illustrating a change of status of seven "shell rot external" utility poles after restoration according to aspects of the present disclosure. The seven poles are initially surrounded by "early decay" poles. After restoration, they "move across the decision boundary" and more closely resemble "normal" poles. The decision boundary between {Normal} poles vs. {Early Decay, Shell Rot External} poles, is denoted by differing shades of circle in a typical plot.

Figure 8:
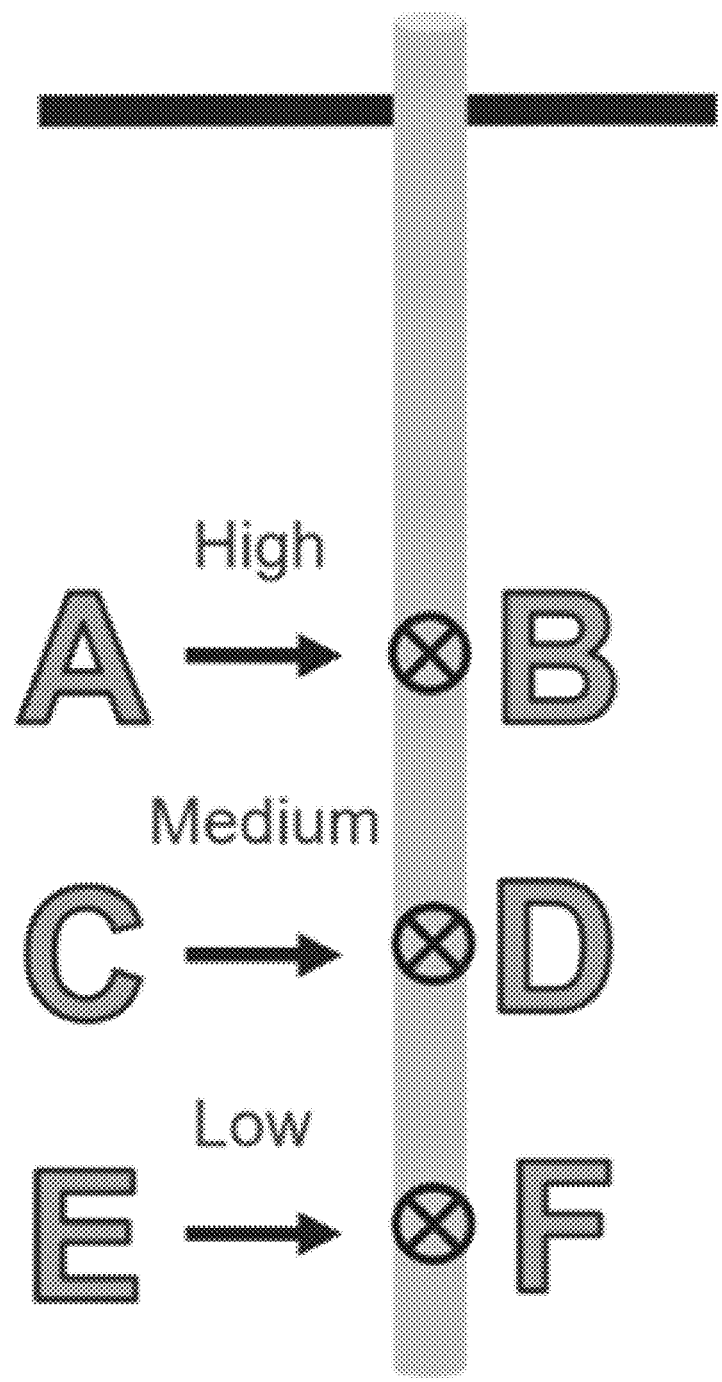
FIG. 8 is a plot illustrating an illustrative pole data collection scheme involving mechanical knocking with two different strengths—strong and weak, at three different heights both parallel and perpendicular to optical fiber sensor cable direction according to aspects of the present disclosure.

FIG. 8 is a schematic diagram showing an illustrative data collection scheme performed on a typical set of utility poles including knocking with two different strengths—strong and weak, at three different heights both parallel and perpendicular to the cable direction.

We may now describe the steps associated with our inventive method according to aspects of the present disclosure that was outlined in the flow diagram of FIG. 3

Step 1 of the method involves data collection of DAS data resulting from hammer knock on {Normal, Early Decay, Shell Rot External} poles and at 5-11 cable points around each pole. The illustrative knocking locations are illustrated in FIG. 7. A metronome timer is used to calibrate the timing of each knock such that neighboring knocks do not overlap. With a peak-finding algorithm, each sample is extracted from a raw waveform, which contains about 6.9 secs of DAS data at 8 kHz (roughly 0.4 s before the knock and 6.5 s after the knock). As indicated in the flow chart, for our deep representation methodology involving three separate DAS signals, two of which should originate from a common utility pole that is excited.

Step 2 of the method is a preprocessing step in which waveform data are transformed into the time-frequency domain representation by applying short-time Fourier transform (STFT) with Hann window of size 2048. The resulting spectrogram is truncated up to 500 Hz.

Step 3 of the method is a data augmentation step wherein during each epoch of training, 3 of the 5 cable locations, 2 replicates of the 4 knocks at the same location, and 4 of the 6 knocking locations on the pole are randomly sampled, to prevent over-fitting or getting stuck in local optima.

Step 4 of the method is a contrastive training step. Assuming there are K samples collected from each of the P poles. Two samples from the same pole and one sample from a different pole form a triplet (with anchor, positive, and negative). The total number of triplets is $PK^2(P-1)\times(K-1)$ and most of them are redundant and of little use after the first few epochs. We apply the "batch-hard" triplet loss below to facilitate learning represented by:

$$\mathcal{L}_{BH} = \sum_{i=1}^{P}\sum_{a=1}^{K}\left[m + \max_{p=1,\ldots,K} D(f_\theta(x_a^i), f_\theta(x_p^i)) - \min_{j=1,\ldots,P, n=1,\ldots,K j\ne i} D(f_\theta(x_a^i), f_\theta(x_n^j))\right]$$

After deep metric learning, the time-frequency spectrum data is projected into a low-dimensional embedding space, which could preserve unique characteristics of each pole, that is, samples collected from the same pole become close to each other.

Step 5 of our inventive method may include secondary tasks. Such secondary machine learning tasks can be performed based on needs, including: training KNN classifier based on the learned embedding to assess the pole integrity; storing the embedding as a low-dimensional feature and subsequent visualization on a profile map; rejection of unconfident samples based on the neighborhood structure of the embedding space; and identification or tracking of poles exhibiting a change of status based on similarity of a query pole to historical data collected from the same pole.

FIG. 9 is a schematic diagram showing an illustrative model architecture of a Neural Network employed according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for operating a distributed fiber optic sensing (DFOS) distributed acoustic sensing (DAS) system including a length of optical sensing fiber suspended aerially by a plurality of utility poles and in optical communication with a DFOS interrogator/analyzer, said method comprising:

operating the DFOS/DAS system while manually exciting more than one of the poles to obtain a frequency response of the excited poles;

contrastively training a convolutional neural network (CNN) with the frequency responses obtained;

classifying the utility poles using the contrastively trained CNN; and generating a profile map of the excited poles indicative of the classified utility poles.

2. The method of claim 1, wherein the manual excitation of each of the more than one of the poles includes mechanical impacts of two different strengths at three different pole heights both parallel to and perpendicular to a direction in which the aerially suspended optical sensing fiber is oriented.

3. The method of claim 2, wherein the frequency response of the excited poles are transformed into a time-frequency domain by applying a short-time Fourier transform (STFT) having a Hann window of size 2048 such that the resulting spectrogram is truncated up to 500 Hz.

4. The method of claim 2, wherein the mechanical impacts are performed at varying intervals of time between impacts.

5. The method of claim 4, wherein the classification for the mechanically impacted poles of the plurality of poles is indicative of a pole condition selected from the group consisting of; normal, early decay, shell rot, and restoration.

6. The method of claim 1, wherein 4 of the 6 manual excitations performed on an individual pole are randomly sampled for subsequent training and/or classification.

7. The method of claim 6, wherein at least two poles of the plurality of poles are mechanically excited for training and subsequent analysis.

8. The method of claim 7, wherein K mechanical impacts (samples) are performed from each of P poles and two samples from the same pole and one sample from a different pole form a triplet and a triplet loss is performed.

* * * * *